Feb. 5, 1963 — C. E. STROBURG ETAL — 3,076,621
TWINE TENSIONER
Filed Aug. 7, 1961
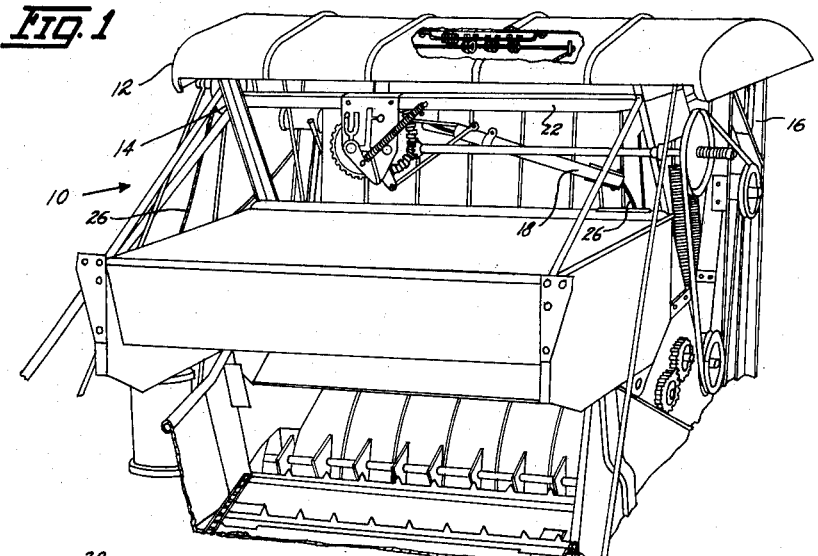
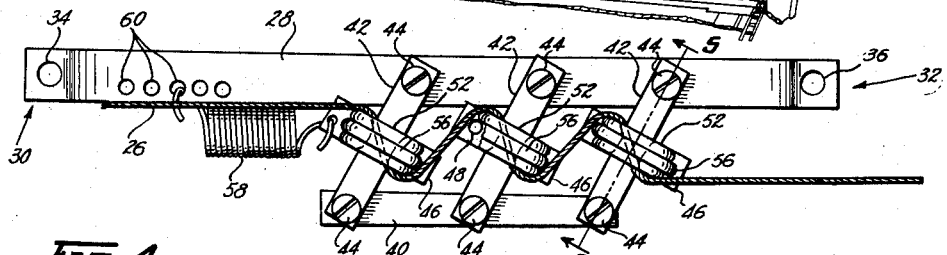
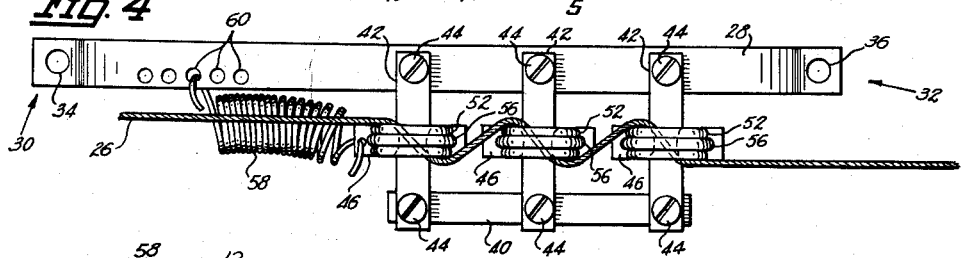
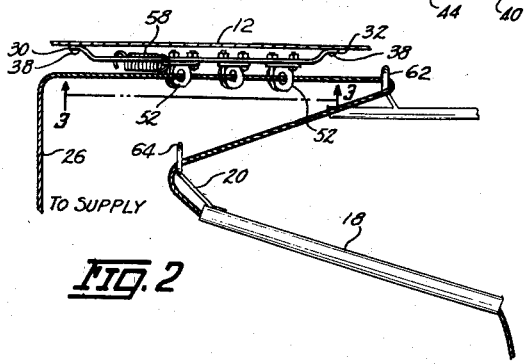
INVENTORS.
CLARK E. STROBURG
ELDON L. STROBURG
BY
ATTORNEY.

United States Patent Office 3,076,621
Patented Feb. 5, 1963

3,076,621
TWINE TENSIONER
Clark E. Stroburg and Eldon L. Stroburg, Blockton, Iowa
Filed Aug. 7, 1961, Ser. No. 129,811
7 Claims. (Cl. 242—154)

This invention relates to twine tensioning devices and has been designed particularly for use with the twine wrapping mechanism on a hay baler although it is not necessarily limited thereto.

In the twine wrapping mechanism on a hay baler, a supply of roller twine is contained in a suitable receptacle on the baler from which it is drawn through various devices to the point of being wrapped about a bale of hay. Such devices include a tensioning means intermediate the supply receptacle and point of wrapping for efficient functioning of the wrapping operation and to provide sufficient tautness in the twine for severing between successive bales of hay as is well known.

A conventional form of twine tensioner used is known as the disk type tensioner which comprises a pair of like rotatable disks yieldingly held in juxtaposition and having their perimeters flared or dished in opposite directions so as to provide a V-shaped track or groove similar to that on a pulley wheel. The twine is reeved over such tensioner which is located so as to provide the required tension in a well known manner.

It has been our experience that the conventional disk type tensioner is satisfactory only when twine is drawn from the supply receptacle in a free and smooth unwinding of the supply roll and that in the numerous and frequent situations where the unwinding of the twine is not free and smooth, there are many disadvantages to the conventional tensioner. In this regard there are frequent occurrences of knots or large spots in the twine which ride out of the groove on the disk tensioner and make it necessary for the baler operator to dismount from his tractor to properly reengage the twine with the tensioner.

We have also observed that often the disk type tensioner will continue to rotate after the twine is cut and this results in the withdrawing or pulling up of the twine from the arm mechanism at the wrapping end so that insufficient twine length is left at the wrapping end to be engaged by the wrapping mechanism for the succeeding bale.

In addition there are times when the twine becomes caught or somewhat tangled within the supply receptacle so as to temporarily resist a free unwinding and the tension thus created is added to the unyielding tension provided by the disk tensioner with the result that the twine often breaks.

It can also be pointed out that some twine has a considerable amount of fuzz causing the formation of fuzz balls between the disks of the disk tensioner and this results in holding the disks apart to the point of relieving the tension sufficiently to impair the proper functioning of the wrapping operation.

With these observations in mind one of the objects contemplated by this invention is the provision of an improved twine tensioner which will permit the free passage or movement of knots and large spots in the twine without impairing its efficiency as a tensioning device.

A further object is to provide a twine tensioning device in which the tensioning force is yieldingly applied so as to be releasable when twine tension develops at normally unintended places in the twine line, and which will automatically return to tensioning position when the tension at the normally unintended location is relieved.

Another object inhering herein is the provision of a twine tensioner of the above class for which the efficiency thereof is unaffected by the presence of fuzz on the twine.

Further objects and the more obvious advantages of the invention will be mentioned or else appear plainly from the description which follows.

This invention consists of novel parts and combination of parts to be hereinafter described whereby the objects set forth are attained, as pointed out in the claims, and illustrated in the accompanying drawings, in which:

FIG. 1 is a fragmentary perspective view of a hay baling machine to illustrate one environment in which this invention may be used and with portions of the top of the machine cut away to illustrate the location of this twine tensioner, FIG. 2 is an enlarged elevational view of this invention shown in operating position, FIG. 3 is an enlarged plan view of this twine tensioner showing a twine line related thereto and with the invention in normal operating tensioning position, FIG. 4 is a view similar to FIG. 3 but illustrating the movement of this tensioner with the resulting lessening of tension on the twine, and FIG. 5 is a cross sectional view taken on the line 5—5 of FIG. 3.

Referring to the drawings a fragmentary portion of the bale wrapping end of a hay baling machine is represented generally by the numeral 10 to illustrate one form of application of the present invention, it being understood that no invention is being claimed in machine 10 per se and that it will be referred to only generally with sufficient description of the parts thereof necessary to relate the present invention thereto.

The portion of machine 10 shown includes a top or cover portion 12 carried by suitable frame or brace assemblies 14 and 16. A tubular wrapping arm 18 is hingedly attached at its inner end to a support 20 carried by a cross bar 22 extending between and secured to assemblies 14 and 16. A suitable container or receptacle 24 is attached to machine 10 at the outer left side as viewed in FIG. 1 and such container is for the purpose of holding a supply of rolls or balls of twine 26 for use in the wrapping of bales of hay or straw. Such twine is drawn from container 24 through the wrapping arm 18 where it projects from the outer end as seen in FIG. 1 for engagement by the press roll (not shown) in a well known manner. After each bale is wrapped, the twine 26 is severed near the outer end of arm 18 and it is necessary for an adequate length of twine to project from the arm for proper wrapping of the succeeding bale.

Intermediate arm 18 and container 24 it is customary to provide a twine tensioning means which facilitates the proper running of the twine and provides suitable tension at the outer end of arm 18 so that the twine is easily severed from time to time. The disk type tensioner referred to previously is a conventional form of tensioner in common use but has the several disadvantages which we have pointed out earlier. We have now been able to overcome these disadvantages by our new twine tensioner which we will now describe and with reference being made more particularly to FIGS. 2–4.

An elongated bar 28 has its respective end portions 30 and 32 apertured as at 34 and 36 and offset in the same direction from longitudinal alignment with the major bar length, and such ends 30 and 32 are secured to the underside of top 12 by any suitable means such as bolts and nuts 38 secured thereto through apertures 34 and 36. By this arrangement, the major length of bar 28 is in parallel spaced and depending relationship to the underside of top 12. A second bar 40, preferably shorter in length than bar 28, is spaced laterally from bar 28 and in parallel relationship thereto. Connecting bars 28 and 40 are a plurality of spaced parallel transverse bars or rigid links 42, each of which is pivotally attached at respective ends to the respective bars 28 and 40 by pins 44 or the like. Also each bar or link 42 at a central point intermediate its ends is provided with a transversely arranged support preferably in the form of a bar 46 which are provided with a hole 48 on each respective end. Bars 46 may be integral with members 42 or secured thereto by welds 50. Each bar 46 carries an apertured member or twine guide 52 which may be in the form of a ring or narrow spool or the like, all of which are affixed in the same relative position so that their respective axes are parallel to the longitudinal axis of the respective link 42 to which they are attached.

While the form of member 52 may be varied, we have preferably used the spool like member 52 shown having a peripheral groove 54 to receive the eye bolt 56 which is secured to member 46 through the holes 48. The end of one of the bars 46 nearest to end portion 30 of bar 28 is connected by a yielding means such as spring 58 to one of several longitudinally spaced holes 60 on bar 28 according to the tension desired on member 58.

With spring 58 connected as described, bar 40 is yieldingly urged toward end 30 of bar 28 as shown in FIG. 3. In this position bar 40 remains parallel to bar 28, and links 42, while parallel to each other, are angularly disposed relative to bars 28 and 40 by having pivoted or swiveled on pins 44. The rings or spools 52 are moved correspondingly with links 42 and twine 26 is threaded through the several members 52 which by virtue of their relative positions as shown create a circuitous path for the twine. The direction of twine movement from container 24 is into this tensioner from end 30 and out of it from end 32. Near end 32 the twine 26 passes through a suitably supported eye member 62 to reverse its direction somewhat downwardly to a second suitably supported eye member 64 near or on support member 20 for the wrapping arm 18. After passing through eye member 64, the twine extends through the wrapping arm 18.

The circuitousness of the path of the twine created by the tensioning position of this device (FIG. 3) provides a quite satisfactory amount of twine tension in the operation of the baler 10. The bore or openings in the members 52 have been made relatively large in relation to the diameter of the twine so that knots or large spots in the twine can move freely therethrough without danger of becoming caught or tangled. In addition we have preferably used porcelain spools for members 52 which reduces friction from the twine, but such material is not necessarily required and any type of ring, spool or the like suitable for the purposes indicated may be employed. There are times, however, when the twine catches or becomes tangled in the ball within container 24 and momentarily produces tension at such point as indicated previously. When this occurs, there is an increase of tension against the members 52 whereby links 42 act against spring 58 causing bar 40 to move toward end 32 and thereby change the relative positions of links 42 and members 52 to bar 28 and to the path of movement of the twine 26. This of course changes the axial position of members 52 (FIG. 4) whereby the path of the twine becomes progressively less circuitous in accordance with the amount of added tension created in container 24 and the relative movement of links 42, and thus reduces the twine tension at the point of this device. As soon as tension in container 24 is relieved, spring 58 automatically returns members 52 to the position shown in FIG. 3.

It will thus be appreciated that the movement of links 42 to their extreme position toward end 32 of bar 28 will so orient members 52 that the movement of twine therethrough will be substantially on a straight line and that therefore this device will efficiently operate as described within a relatively wide range of added tension from normally unintended locations.

It is submitted that the invention shown and described is aptly suited to achieve the purposes intended and is characterized by a combination of highly useful and mutually cooperating elements that combine their respective and proportionate functions in accomplishing the objects sought to be obtained.

It will be understood that the phraseology employed herein is for the purpose of description and not for limitation and that modifications and changes in the construction and arrangement of this invention can be made within the scope of what is claimed, without departing from the spirit and purpose thereof. It is thus intended to cover by the claims, any modified forms of structure or mechanical equivalents which may be reasonably included within their scope.

We claim:

1. A tensioning device for a twine line to be interposed in a line of twine intermediate the source of twine supply and the point of use, said device comprising, a first bar, means for fixedly attaching said first bar to a support, a second bar laterally spaced from and parallel to said first bar, a plurality of parallel spaced rigid links each pivotally connected at corresponding ends to said first bar and similarly connected at their other corresponding ends to said second bar, an apertured member secured to each link, yielding means connecting one of said links to said first bar so that said links are disposed on a diagonal plane relative to said first and second bars to define a normal tensioning position, each apertured member being so oriented on its respective link that said tensioning position creates a circuitous path for a line of twine passing successively through said apertured members, and tension in a line of twine exteriorly of said apertured members causing an increase in line tension on said apertured members whereby said links act against said yielding means to pivot on their respective ends and to move said second bar which effects a reorientation of said apertured members longitudinally of said first bar to a position where the circuitousness of the path through said apertured members is lessened and tension at such point is correspondingly relieved.

2. A device as defined in claim 1 wherein said yielding means automatically returns said apertured members to normal tensioning position when tension exteriorly of said apertured members is relieved.

3. A tensioning device for a twine line to be interposed in a line of twine intermediate the source of twine supply and the point of use, said device comprising, a first bar immovably attached to a support, a second bar disposed in parallel spaced relationship to said first bar, a plurality of parallel spaced like rigid links each pivotally connected at corresponding ends to said first bar and similarly connected at their other corresponding ends to said second bar, and apertured twine guide secured to each link in corresponding positions so that their respective axes are parallel to the longitudianl axis of their respective links and parallel to each other, said twine guides being interposed in the path of the line of twine with such line threaded therethrough by being passed respectively into and out of each twine guide at respective corresponding ends, a yielding means connecting one of said links to said first bar whereby said second bar is moved longitudinally of and parallel to said first bar in one direction to correspondingly move said links in unison in parallel position to each other and on a diagonal plane relative to said first and second bar to define a normal twine tensioning position, said twine guides being each moved with their respective links with their axes remaining parallel but so angularly disposed relative to the line of twine travel as to create a circuitous path therefor, and tension in a line of twine exteriorly of said twine guides causing an increase in line tension on said twine guides whereby said links act against said yielding means to pivot on their respective ends and to move said second bar longitudinally of said first bar in the opposite direction whereby the movement of said second bar progressively reorients the axes of said twine guides to the line of movement of the twine so as to progressively lessen the circuitousness of the path of travel of the twine relative to the increase in twine tension.

4. A device as defined in claim 3 wherein said yielding means automatically returns said twine guides to normal tensioning position when tension exteriorly of said twine guides is relieved.

5. A tensioning device for a twine line to be interposed in a line of twine intermediate the source of twine supply and the point of use, said device comprising, an elongated fixed bar member, a plurality of like rigid bars each pivotally secured at one end to said bar member in longitudinal spaced relationship thereon so as to extend transversely thereof in the same direction, means connecting said rigid bars in parallel spaced relationship to each other for simultaneous pivotal movement in such relationship relative to said bar member, an apertured twine guide carried by each rigid bar so that the respective axes of said twine guides are parallel to each other and parallel to the longitudinal axis of their respective link, said twine guides being interposed in the path of the line of twine with such line threaded therethrough by being passed respectively into and out of each twine guide at respective corresponding ends, means normally yieldingly holding said rigid bars in a pivoted position off-set from perpendicular alignment with said bar member in one direction whereby said twine guides are correspondingly moved with their respective axes so angularly disposed relative to the line of twine travel as to create a circuitous path therefor to maintain a predetermined amount of twine line tension, and said rigid bars being movable in the opposite direction against said yielding means under increased tension developed in the line of twine whereby the axes of said twine guides are progressively reoriented to the line of travel of the twine so as to progressively lessen the circuitousness of the path of twine travel and correspondingly lessen the amount of line tension.

6. A tensioning device for a twine line to be interposed in a line of twine intermediate the source of twine supply and the point of use, said device comprising, a plurality of apertured twine guide in longitudinally spaced planar relationship in the path of travel of a line of twine, movable means connecting said twine guides so that their respective axes are parallel to each other, means normally yieldingly holding said movable means to orient said twine guides so that their respective parallel axes are similarly off-set from parallel alignment to the path of twine travel in one direction to define a circuitous path for twine threaded therethrough into and out of corresponding ends and establishing a normal line tensioning path of travel, and said twine guides susceptible to being uniformly re-oriented in their planar relationship so that their respective axes approach a perpendicular alignment with the path of twine travel whereby the circuitousness of the path of line travel is progressively lessened to correspondingly lessen the increased line tension.

7. A device as defined in claim 6 wherein said twine guides are susceptible of being uniformly re-oriented under increased line tension from their normal line tensioning position to and past the point where their axes would be in perpendicular alignment to the longitudinal axis of the path of twine travel so that on the opposite side of such point relative to their normal line tensioning position their respective axes become progressively increasingly off-set from perpendicular alignment with such point to an ultimate position where they present a straight line of travel for the twine.

References Cited in the file of this patent

UNITED STATES PATENTS 2,618,445    Buder  ------------------ Nov. 18, 1952

FOREIGN PATENTS 638,636    Great Britain ------------ June 14, 1950
816,977    Germany -------------- Oct. 15, 1951